United States Patent
Koraichi et al.

(10) Patent No.: US 8,959,602 B2
(45) Date of Patent: Feb. 17, 2015

(54) MODIFICATION OF A SECURED PARAMETER IN A USER IDENTIFICATION MODULE

(75) Inventors: Najib Koraichi, Schimmert (NL); Aguibou Mountaga Barry, Maastricht (NL)

(73) Assignee: Vodafone Holding GmbH, Dusseldorf (DE)

( * ) Notice: Subject to any disclaimer, the term of this patent is extended or adjusted under 35 U.S.C. 154(b) by 655 days.

(21) Appl. No.: 12/840,113

(22) Filed: Jul. 20, 2010

(65) Prior Publication Data

US 2011/0099613 A1 Apr. 28, 2011

(30) Foreign Application Priority Data

Oct. 23, 2009 (EP) .................................... 09013443

(51) Int. Cl.
*G06F 15/16* (2006.01)
*H04L 29/06* (2006.01)
*H04W 12/06* (2009.01)
*H04W 8/18* (2009.01)
*H04W 88/02* (2009.01)

(52) U.S. Cl.
CPC ............ *H04L 63/0853* (2013.01); *H04W 12/06* (2013.01); *H04W 8/183* (2013.01); *H04W 88/02* (2013.01)

USPC .............................................................. 726/6

(58) Field of Classification Search
CPC ......... H04W 12/00; H04W 12/06; H04L 9/00
USPC .............................................................. 726/6
See application file for complete search history.

(56) References Cited

U.S. PATENT DOCUMENTS

| | | | |
|---|---|---|---|
| 7,818,024 B2* | 10/2010 | Gunaratnam et al. | 455/525 |
| 2002/0147012 A1* | 10/2002 | Leung et al. | 455/433 |
| 2004/0087305 A1* | 5/2004 | Jiang et al. | 455/432.1 |
| 2004/0131185 A1* | 7/2004 | Kakumer | 380/247 |
| 2007/0129078 A1* | 6/2007 | De Beer | 455/445 |
| 2007/0288752 A1* | 12/2007 | Chan | 713/171 |
| 2010/0041438 A1* | 2/2010 | Brown | 455/558 |
| 2010/0105434 A1* | 4/2010 | Hong | 455/558 |
| 2014/0105111 A1* | 4/2014 | Karaoguz et al. | 370/328 |

* cited by examiner

*Primary Examiner* — Esther Benoit
(74) *Attorney, Agent, or Firm* — International IP Law Group, PLLC

(57) ABSTRACT

There is provided a user identification module configured for use in a mobile communication device. An exemplary user identification module comprises a first data item being accessible for reading a value of a parameter used in the operation of the user identification module. The exemplary user identification module also comprises at least two second data items, the second data items being unmodifiable and each second data item including a value of the parameter. The first data item includes a modifiable reference addressing one second data item.

10 Claims, 2 Drawing Sheets

MODIFICATION OF A SECURED PARAMETER IN A USER IDENTIFICATION MODULE

CROSS REFERENCE TO RELATED APPLICATIONS

This application claims priority to European (EP) Patent Application No. 09 013 443.8, filed on Oct. 23, 2009, the contents of which are incorporated by reference as if set forth in their entirety herein.

BACKGROUND

In mobile communications, access to a mobile communication network is usually restricted to mobile communication devices being operated in connection with a valid subscription with a mobile network operator. Therefore, a mobile communication network identifies and authenticates mobile communication devices when they are accessing the network and authorize the devices to function in the network. For identifying and authenticating mobile communication devices, user identification modules are used that are included in the mobile communication devices used for accessing mobile communication networks. A user identification module stores data, which are used in the operation of the mobile communication device in a mobile communication system particularly including information and/or applications for identifying and/or authenticating a mobile communication device in a mobile communication network.

Usually, user identification modules are configured as so called smartcards, i.e. cards containing an embedded integrated circuit for storing and processing information. The cards are issued by or under the control of a network operator usually in response to a registration of a subscription. If the subscriber is an individual, the user identification module may be personal to the individual and used by the individual to activate a mobile communication device and use it for telecommunications purposes in a mobile communication system. In another example, a user identification module may be used in a telematics application to identify a particular telematics device for use in a mobile communication system. In each case, user identification modules are usually specific to a particular network (the so called home network) or its operator. In particular, identification and/or authentication information are determined by the home network operator and secret data stored in a user identification module are shared only with the home network operator.

In order to prevent unauthorized use and/or manipulation of sensitive data stored in a user identification module, those data are secured in a special way. For this purpose, the microcontroller of a smartcard comprising a user identification module usually provides a secure environment for the execution of applications and the storage of data. Moreover, the microcontroller is integrated into a secure hardware environment provided by the smartcard, which is physically protected against manipulations, such as, power analysis, reverse engineering, etc. Within such an environment sensitive data may be stored in the smartcard in such a way that the relevant data files cannot be modified after the sensitive information are stored therein once by the supplier of the user identification module at the time of manufacture.

Since usually the operator-related identification and authentication data are stored in a user identification module in a non-modifiable manner, it is not possible to reuse a user identification module after subscribing to another home network or the mobile communication network. In this case, the new home network operator has to issue a new user identification module comprising new identification and/or authentication data for use within the scope of the subscription to this operator. This is resource-consuming for the new mobile network operator that has to issue the card and for the user of a mobile communication device that has to change the user identification module in the mobile communication device. For the user, this has the further drawback that personal data stored in the user identification module during use thereof are lost.

A change of a user identification module is especially difficult in terms of the required logistics when telematics devices are involved which are incorporated into products. However, in some situations a change of the home network may be required or advantageous especially for those devices or products. For instance, a telematics device with its user identification module may be incorporated into a product when located in one country, but the product may then be exported or for other reasons relocated to another country for use therein. In this case, it would be advantageous to change the home network to one located in the new country. However, the destination may be unknown at the time when the device and its user identification module are incorporated into the product. In such a product, it would be advantageous to change the home network without having to change the user identification module in the product.

SUMMARY

Exemplary embodiments of the invention relate to the modification of a secured parameter in a user identification module, particularly in a user identification module used in mobile communications. More specifically, an exemplary embodiment of the invention may be related to a method for changing a parameter stored in a user identification module and to a user identification module allowing changing a parameter stored therein.

An exemplary embodiment may allow for modifying sensitive parameters stored in a user identification module in way, which keeps security against tampering as much as possible.

A user identification module according to an exemplary embodiment comprises a first data item being accessible for reading a value of a parameter used in the operation of the user identification module, and at least two second data items, the second data items being unmodifiable and each second data item including a value of the parameter. The first data item includes a modifiable reference addressing one second data item.

An exemplary method for changing a value of a parameter stored in a user identification module is also provided. The parameter is read from a first data item stored in the user identification module. The first data item includes a reference addressing one of plurality of second data items stored in the user identification module. The second data items are unmodifiable, and each second data item includes a value of the parameter. The exemplary method comprises changing the reference referring to one second data item to refer to a further second data item to change the value of the parameter.

An exemplary embodiment may allow modifying the relevant value of a parameter stored in a user identification module by selecting one of a plurality of predetermined values stored in second data items. The second data items are not modifiable. This ensures that the value of the parameter cannot be changed to a new, unauthorized value. The selection of the relevant value is done in such a way that a reference included in a first data item is chosen to address the second data item including the desired value. In an exemplary embodiment, one defined data item can be accessed to read the value of the parameter as it is the case in conventional user identification modules. Thus, program routines reading the value of the parameter do not have to be adapted to be able to access different data items.

As used herein, the term user identification module is to be understood in its broadest sense. It particularly refers to a hardware and/or software module which is used for identification and/or authentication in certain application or system, particularly in a mobile communication system. The user identification module may verify the identity of a user and/or it may be used to identify/authenticate a user towards certain entity. The user identification module may be configured as a smartcard or other independent apparatus which can be connected to a device, such as, for example, a mobile communication device. Likewise the user identification module may be fixedly integrated into certain device. Likewise, the term data item is to be understood in its broadest sense. In particular, the term refers to information being stored in a specific location in the user identification module. For example, such location may be a specific file in the user identification module or a specific part within a file stored in the user identification module.

In one exemplary embodiment of the user identification module and the method, the reference is only modifiable to include one of the second data items. Thus, the security of user identification module is further enhanced.

A further exemplary embodiment of the user identification module and the method provides that an identification code is assigned to each second data item and that the reference includes the identification code, the allowed values of the reference being restricted to the identification codes assigned to the second items. Hereby, it is ensured in an easy way that the reference can only be modified to include one of the second data items stored in the user identification module.

In exemplary user identification modules, data are usually stored in files which are referred to as elementary files. Therefore, in one exemplary embodiment of the user identification module and the method, the first data item is included in a first elementary file stored in the user identification module. A related embodiment of the user identification module and the method provides that the first elementary file is a standard file assigned to the parameter. The term standard file particularly refers to the file, which is usually used in conventional user identification modules to specify the value of the parameter. When the user identification module is used in mobile communications, this file may also be specified in the relevant mobile communication standard. Storing the reference to the relevant value of the parameter in the standard file of the parameter has the advantage that the usual or standard file structure of the user identification module can be maintained. It only has to be supplemented by the second data items including the possible values of the parameter.

In one exemplary embodiment of the user identification module and the method, the second data items are included in a second elementary file stored in the user identification module, particularly in a table comprised in the second elementary file. Hereby, the values of the parameter can be stored in the user identification module in a well-arranged manner. Moreover, storing the second data items in one file has the advantage that only this file has to be protected against modifications.

The user identification module may be used in mobile communications. Here, in one exemplary embodiment of the user identification module and the method, the parameter is a user identification code for identifying a user in a mobile communication network or a cryptographic key used for authenticating a user in a mobile communication network. These parameters are often to be changed when the subscription under which the user identification module is used is changed to another mobile network operator. Thus, by modifying the value of such parameters changes of the mobile network operator can be done without having to replace the user identification module. The user identification code may particularly be configured as IMSI (International Mobile Subscriber Identity) and the cryptographic key may be the key Ki used in mobile communications for authentication.

Furthermore, in one exemplary embodiment of the user identification module and the method, the user identification module is configured as a Subscriber Identity Module (SIM) or as a Universal Subscriber Identity Module (USIM). A SIM is the user identification module used in mobile communication networks according to the GSM standard (GSM: Global System for Mobile Communications) and the USIM is the user identification module.

A change of the value of the parameter may be controlled externally of the user identification module. Therefore, in one exemplary embodiment of the invention, the reference is modifiable in response to a command received in the user identification module from a remote location. Moreover, in one exemplary embodiment of the method, the reference is changed in response to a receipt of a command received via a communication network, the user identification module being connected to the communication network via a mobile communication device. The command may be transmitted to the user identification module from a remote server connected to the communication network.

Furthermore, according to one exemplary embodiment, a system for changing a parameter of a user identification module is suggested. The system includes a user identification module as described herein and a remote server being connectable to the user identification module. The remote server is adapted to transmit an instruction to the user identification module and the instruction specifies one second data item. The user identification module is adapted to modify the reference to refer to the specified second data item in response to a receipt of the instruction.

Moreover, a mobile communication device according to an exemplary embodiment may comprise a user identification module as described herein.

BRIEF DESCRIPTION OF THE DRAWINGS

The aforementioned and other aspects of the invention will also be apparent from and elucidated with reference to the embodiments described hereinafter making reference to the drawings. Reference will be made by way of example to the accompanying drawings in which.

DETAILED DESCRIPTION OF SPECIFIC EMBODIMENTS

Figure 1:
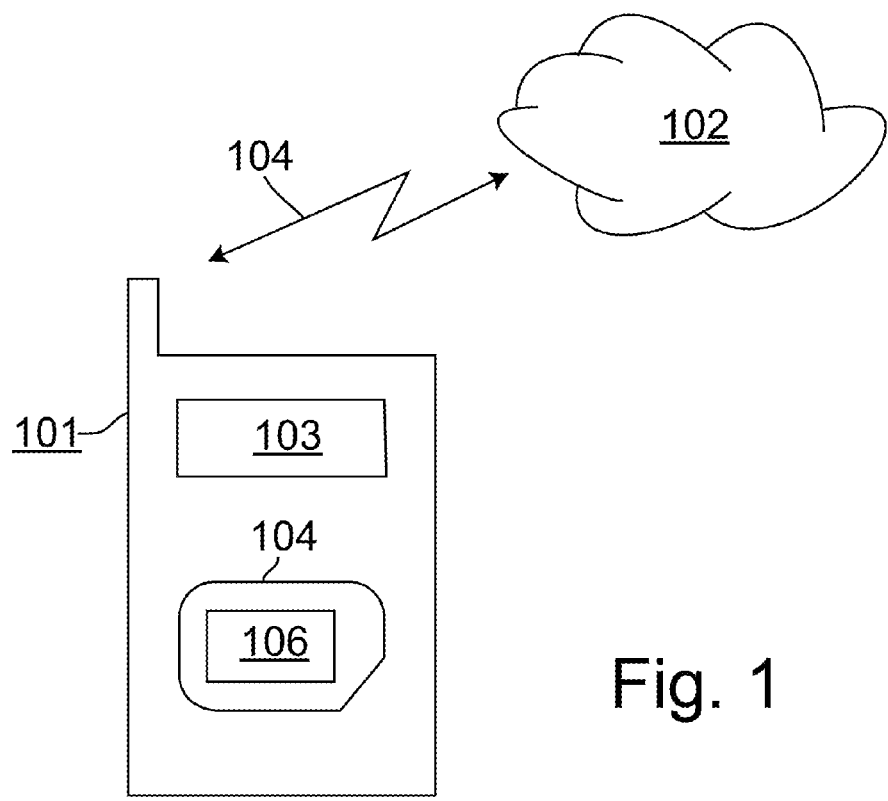
FIG. 1 is a block diagram of a mobile communication device including a user identification module according to an exemplary embodiment of the invention.

By way of example, the invention will now be described with reference to a user identification module used in mobile communications. FIG. 1 shows a mobile communication device 101 which can be connected wirelessly to a mobile communication network 102. For this purpose, the mobile communication device 101 comprises a radio module 103 enabling the mobile communication device 101 to send data to the mobile communication network 102 and to receive data from the mobile communication network 102 through an air interface 104. For instance, the mobile communication network 102 may be configured according to the GSM or UMTS standard (GSM: Global System for Mobile Communications; UMTS: Universal Mobile Telecommunications System). However, the invention may also be practiced in other mobile communication networks 102. The radio module 103 is configured for use in a mobile communication network 102 of the present type.

The mobile communication device 101 may be used by a user to communicate through the mobile communication network 102. In this case, the mobile communication device 101 also comprises a user interface which is not shown in FIG. 1 and allows the user to interact with the mobile communication device 101. In particular, the mobile communication device 101 may be a mobile telephone, a PDA (Personal Data Assistant) or the like. In a further embodiment, the mobile communication device 101 is configured as a telematics device, which can be incorporated into a product in order to provide connectivity through the mobile communication network 102. For instance, such a telematics device may be incorporated into a vehicle for connecting the vehicle to a data centre or to other vehicles (car-to-car communication) or the telematics device may be attached to freight in order to monitor the freight during transport.

For identification and/or authentication in the mobile communication network 102, the mobile communication device 101 comprises a user identification module 105. The user identification module 105 comprises a microcontroller 106 allowing for executing programs and for storing data in the identification module 105. In case the mobile communication network 102 is a GSM network, the user identification module 105 is configured as SIM according to the GSM standard, and if the mobile communication network 102 is a UMTS network, the user identification module 105 is configured as a USIM according to the UMTS standard.

To prevent tampering, the microcontroller 106 provides a secure environment for the execution of application and the storage of data. Particularly, this means that unauthorized access to data and processes is prevented due to the hardware design of the microcontroller 106 and due to cryptographic mechanisms used for managing data in the microcontroller 106. Moreover, the microcontroller 106 is integrated into a secure hardware environment provided by the smartcard 107, which is physically protected against manipulations, such as, power analysis, reverse engineering etc.

In one embodiment, the user identification module 105 is configured as a smartcard, which is removably connected to a card reader of the mobile communication device 101, which is not shown in FIG. 1. However, it is likewise possible that the user identification module 105 is provided in another form than as a smartcard. In particular, the user identification module 105 may be permanently integrated into the mobile communication device 101. This may particularly be useful in telematics devices which are configured as simple as possible and which do not need to dispose of a card reader when the user identification module 105 is permanently integrated into the devices.

In particular, the user identification module 105 stores parameters, which are used when the mobile communication device 101 is identified and authenticated in the mobile communication network 102. These parameters may be specific to the operator of the home network which may also issue the user identification module 105 in connection with a subscription of a user to the home network. In conventional mobile communication system, such parameters may only be known to the mobile operator of the home network, while other networks which the mobile communication device 101 may access (roaming) may rely on the home network for identifying and authenticating the mobile communication device 101. In addition, the user identification module 105 may store further data which are used in the operation of the mobile communication device 101. Also, personal data of the user, such as, for example, contact details, may be stored in the user identification module 105 during operation.

As other use data the parameters provided in the user identification module 105 are specified in elementary files. One elementary file (EF) may contain one or more parameters. According to the data structure in the user identification module 105 elementary files can be combined in a dedicated file (DF), which may also comprise one or more further dedicated files. Dedicated files correspond to folders including one or more elementary files or dedicated files. The directory comprising all elementary and dedicated files is called master file (MF). In order to be able to determine the parameters when necessary, their values are specified in predetermined files, which may be identified using their file name, for example, and which may be stored in a predetermined location within the directory structure of the user identification module 105.

Among the sensitive parameters that are specific to the mobile operator issuing the user identification module 105, are the IMSI, the individual authentication key Ki and an OTA key used in a so called OTA mechanism to authenticate accesses to the user identification module 105 from a remote location (OTA: Over the Air). The IMSI may be stored in an elementary file $EF_{IMSI}$ and the other mentioned parameters may likewise be stored in predetermined elementary files. The IMSI is a numeric identification code, which is uniquely assigned to a user identification module 105 and used for identifying a mobile communication device 101 in the mobile communication network 102. Usually, the IMSI also comprises a part encoding the country of the subscription and/or the home network operator. The key Ki is used in the process of authenticating the mobile communication device 101 in the mobile communication network 102. For instance, the key Ki is used for calculating an authenticator in the authentication procedure, which is verified in the mobile communication network 102.

Parameters, as such described before, have to be protected against unauthorised access in order to prevent unauthorized use of the parameters. In conventional user identification modules 105, the elementary files including the parameters are configured in such a way that the values of the parameters cannot be modified after they have been stored in the elementary files ones. In other words, the elementary files including the parameters do not permit write access. It is a disadvantage of this approach that the parameters cannot be changed. However, a change of operator-specific parameters would be advantageous when changing the home network in order to avoid the need to change the user identification module 105.

In the user identification module 105 according to the present invention, the values of certain parameters can be changed during the lifetime of the user identification module 105. For this purpose, the user identification module 105 comprises a data structure which allows for securely changing the value of a parameter. The parameter can be each parameter stored in the user identification module 105. Moreover, it is possible to have several parameters stored in the user identification module 105, which are modified in the same way. In this case, the user identification module 105 may contain for each parameter a data structure of the same type.

Figure 2:
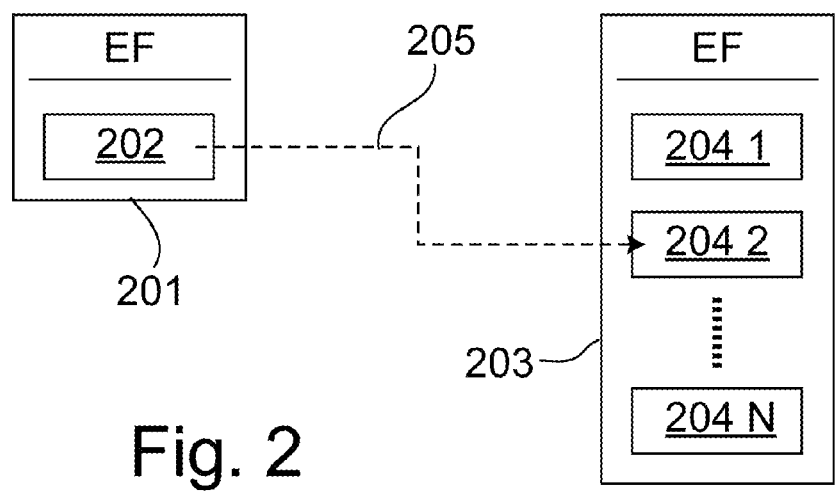
FIG. 2 is a block diagram of a file structure included in the user identification module.

As schematically depicted in FIG. 2, the user identification module 105 comprises an elementary file 201 including a data item 202 which specifies the relevant value of the parameter. The file 201 is referred to as standard file for this parameter. The standard file 201 may only specify the value of one parameter or it may include value(s) of one or more further parameters. The standard file 201 may be identified in the same way as in a conventional user identification module 105. Thus, program routines can identify the standard file 201 specifying the value of the parameter in the known manner and modifications of programme routines can be dispensed with. However, unlike in conventional user identification modules 105, the standard file 201 does not include the value of the parameter. Instead, the data item 202 assigned to the parameter includes a reference to a location including the relevant value of the parameter. In FIG. 2, the reference is denoted by an arrow 205. The location to which the reference points may particularly be another elementary file 203 stored in the user identification module 105. Due to the reference, the relevant value of the parameter is read through the standard file 201. Usually, such an access to data is referred to as dereferencing the reference. In many operation systems of user identification modules 105, the possibility to user references in such a way is a standard feature, so that this functionality does not have to be added to the user identification module 105 especially for providing the possibility to modify the value of a parameter P. Rather, a standard feature of an identification module 105 can be used. In order to change the value of the parameter the reference may be changed from referring to a first value to refer to a second value of the parameter.

Possible values of the parameter are stored in one elementary file 203 as depicted in FIG. 2 or in more than one separate elementary files in the user identification module 105 and the file 203 or the files include(s) data items 204$i$ (i=1, ..., N, where N is the number of possible values for the parameter). Preferably, to each value, an identification code is assigned. If the data items 204$i$ including the values of the parameter are stored in one elementary file 203, the values may be stored in the form of a table allocating the identification codes to the existing values. In one embodiment, the identification codes may be consecutive numbers. Thus, for N possible values Vi (i=1, ..., N) the table may have a form of the following type, where each row corresponds to one data item 204$i$.

| Identification code | Value |
|---|---|
| 1 | V1 |
| 2 | V2 |
| . | . |
| . | . |
| . | . |
| N | VN |

However, other formats for storing the values and their assigned reference may also be used. In an alternative embodiment, the plurality of values of the parameter is not stored in one elementary file 203, but in several elementary files. In this embodiment, each of the several elementary files may include one or more data item(s) 204$i$ each comprising one value of the parameter. Preferably, also in this embodiment an identification code is assigned to each value of the parameter. The identification code may be included as regular (use) data in the relevant elementary file in allocation to the value of the parameter or the reference may be included in metadata assigned to the file, i.e. data about the elementary file as such. In particular, the identification code may be included in the name of the file. This is especially advantageous, when a file includes only one value of the parameter.

Furthermore, in certain situations not only one parameter is to be modified in the user identification module 105, but several parameters. In particular in view of such situations, one embodiment provides that in the user modification module values for a predetermined set of parameters are stored together and that to these values one single identification code is assigned. This may be understood such that a data item 204$i$ assigned to one value of a parameter also includes values of further parameters. The identification of a value of a particular parameter in the set of parameters may be identified in this embodiment based on an identification of the parameter, which may be given explicitly or implicitly. In particular, in this embodiment the values may again be stored in a table in one elementary file 203. Here, a value of a specific parameter in the n-th set of values may be identified based on the column of the table which is assigned to this parameter. For M parameters Pi (i=1, ..., M) in the set and N possible values Vi_Pj (i=1, ..., N) for each Parameter Pj, the table may have the following form, where again each row corresponds to one data item 204$i$:

| Identification code | Value of P1 | Value of P2 | ... | Value of PM |
|---|---|---|---|---|
| 1 | V1_P1 | V1_P2 | ... | VM_P1 |
| 2 | V2_P1 | V2_P2 | ... | VM_P2 |
| . | . | . | . | . |
| . | . | . | . | . |
| . | . | . | . | . |
| N | VN_P1 | VN_P2 | ... | VM_PM |

Of course, other formats for storing the sets of values for the parameters can also be chosen. For instance, the contents of the elementary file 203 comprising the values of the parameters may be organized in another way than as a table of the aforementioned format, or the sets of values may be distributed among several elementary file, where each file comprises one or more sets of values for the set of parameters. In particular in the latter case, the identification codes may again be included in the elementary files as regular data or they may be included in the metadata of the elementary files as described before.

The different values of the modifiable parameter or of a plurality of modifiable parameters may be stored in the user identification module 105 in a secure process, which may be executed at the time of individualization of the user identification module 105 and/or at the time of manufacture, which may coincide with each other. The values are stored in the user identification module 105 in such a way that they cannot be modified or deleted after they have been stored in the user identification module 105. Again, this means that they are stored in the user identification module 105 without write access. Thus, the possible values of the modifiable parameter or parameters are determined before the user identification module 105 is issued and cannot be modified or supplemented afterwards. This prevents unauthorized parties to specify a new value for a parameter after the user identification module 105 has been issued.

As described before, the standard file 201 for a modifiable parameter comprises a reference to the current value of the parameter. This reference can be changed in order to change the value of the parameter. In particular, the reference includes the identification code of the relevant data item 204$i$ or the relevant value of the parameter. In addition, the reference may specify the file in which the value is stored, if the file cannot be identified using the identification code alone. The latter is usually the case, if the identification code is not included in the file name. Thus, when a program routine reads the value of the parameter, it selects the standard file 201 of the parameter at first. This corresponds to the standard routine for reading the value of the parameter. After having selected the standard file 201, the reference stored therein is read and analysed. Then, the location of the relevant value of the parameter is determined based on the evaluation of the reference, i.e. the location the elementary file storing data item 204 including the relevant value of the parameter is determined and in the file the relevant value can be identified, if several values are included in the file. Upon the evaluation of the reference, the identified value of the parameter is determined and read.

In order to change the value of a parameter from a first value to a second value, the identification code of the first value included in the reference is replaced by the identification code of the second value. For executing such modifications of values of parameters, the user identification module 105 may include an application, which includes routines for replacing the identification codes. Other applications may not be authorised to modify the reference, so that it is prevented that an unauthorised person installs an application in the user identification module 105 or in the mobile communication device 101, which modifies a parameter in an unauthorized manner. One authorized application may be used for modifying the values of all modifiable parameters stored in the user identification module 105. This application may be integrated into the operating system of the user identification module 105 or it may be a separate application. In a further embodiment, the functionality of modifying values of parameters may be integrated into further authorized applications of the user identification module 105, e.g. in those applications reading and/or processing the values of the parameters, respectively. As an alternative, the application for modifying values of parameters may be provided externally to the user identification module 105 and the user identification module 105 includes a mechanism to securely authenticate the external application, when it accesses the user identification module 105.

In order to prevent that values of a parameter can be changed to values, which have not been authorized, the reference in a standard file of a parameter can only refer to such locations of values of the parameter, which have been established in the above mentioned secure process. For this purpose, modifications of the references are restricted. In particular, the identification code included in the reference can only have one of a plurality of valid values, which correspond to the identification codes of the values which have been stored in the user identification module 105 in the secure process. Thus, if the identification codes of the values of one parameter comprise consecutive numbers, the valid identifications codes may be specified by a number range including those identification codes. If the reference includes further parts in addition to the identification code, such as, for example, a name of an elementary file comprising the values of a parameter, this part of the reference is configured to be not modifiable.

The validity of a change of parameter may be verified by the application, which executes the replacement of one identification code with another. The new identification code may be a parameter which is passed to this application, when it is invoked. Then, the application checks whether the received identification code is a valid identification code. If the application determines that the received identification is valid, it changes the existing identification code in the reference to the received identification code. If the application determines that received identification is not valid, it does not change the reference and discards the received identification code. Moreover, further routines may be executed by the application. For instance, the application may record and/or signalise the receipt of the invalid identification code as an attempt to defraud. If the value of the parameters is changed by an application provided externally to the user identification module 105, a further application of the user identification module 105 may verify the validity of the change in the same way before the change is effected.

The possible values of the modifiable parameter or of a plurality of modifiable parameters of a user identification module 105 may be registered with the supplier of the user identification module 105 or with a trusted management centre operated by a trusted third party. To a mobile network operator (only) the value(s) of the parameter or parameters are communicated, which are in use, when the user identification module 105 is in a subscription with this operator. Thus, when the user identification module 105 is issued by a first home network operator certain value(s) of the modifiable parameter or parameters are in use and only such value(s) are communicated to the home network operator. When the value of a parameter is to be changed, the change may be requested with the management centre. The management centre will then authorize the change. For instance, only mobile network operators and/or the subscriber may be authorized to initialize a change of a parameter in the user authentication module. Preferably, the management centre will also execute the change of the parameter. The new value of the parameter will be communicated (only) to the mobile network operator, which uses the value. Thus, if the value of a parameter is changed due to a change of the home network, the new value of the parameter will be communicated to the operator of the new home network.

Figure 3:
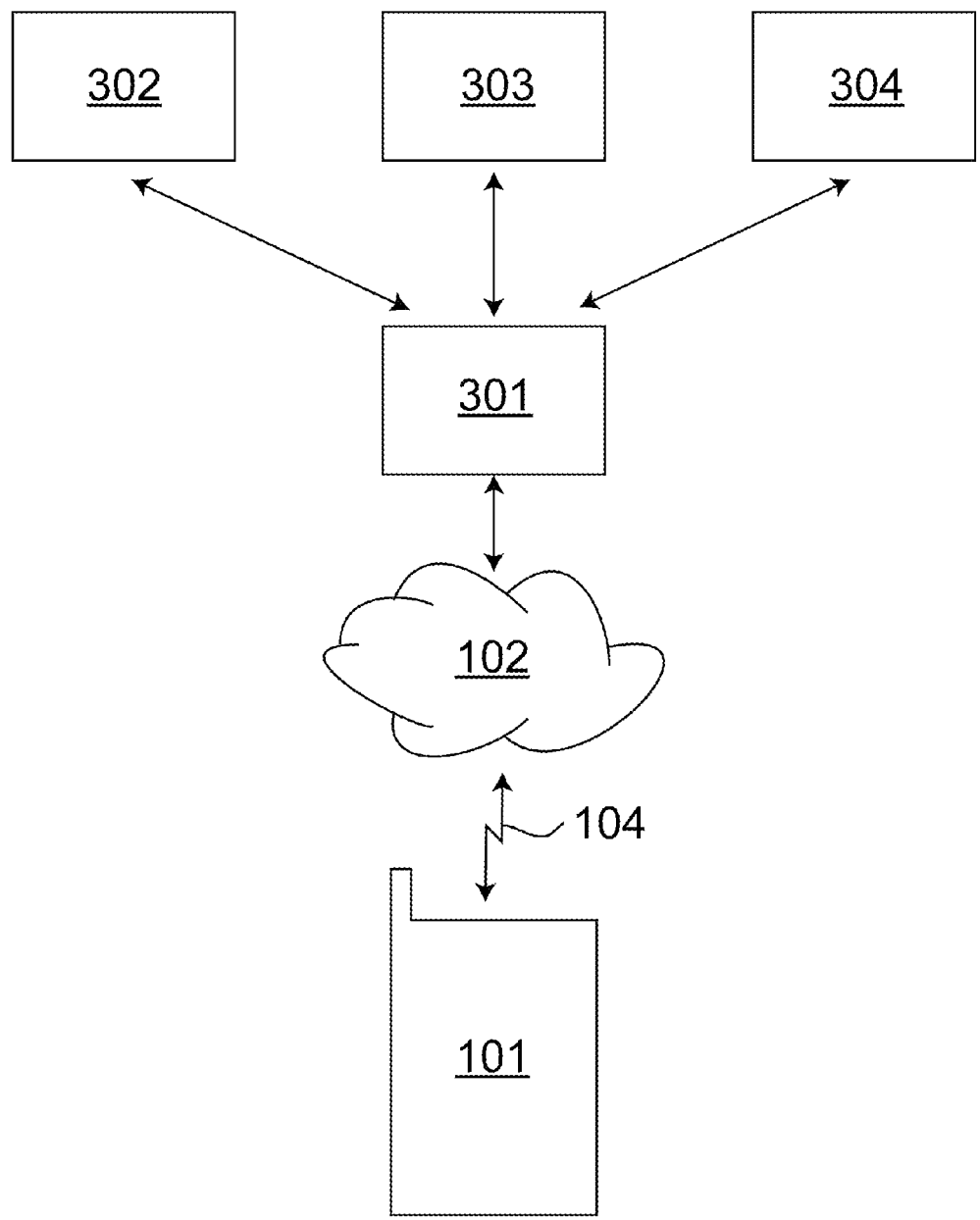
FIG. 3 is a block diagram of a system for changing a parameter of the user identification module remotely.

In one embodiment, which is schematically depicted in FIG. 3, the change of a parameter in the user identification module 105 is effected remotely using a management server 301. The management server 301 is connected to the mobile communication network 102 to which the mobile communication device 101 comprising the user identification module 105 is connected. For instance, the Management server 301 may be operated by the aforementioned management centre managing the values of the parameters of user identification modules 105. In the embodiment shown in FIG. 1, the management server 301 is connected to several mobile network operators 302, 303, 304, which may request the management server 301 to execute a change of a parameter in a user identification module 105. By way of example, three mobile network operators 302, 303, 304 are depicted in FIG. 3.

After having authorized a changes request, the management server 301 transmits an instruction to change a parameter value to the user identification module 105 via the mobile communication network 102. For instance, the instructions may be included in a message, which is sent to the mobile communication device 101 using a messaging service provided in the mobile communication network 102, such as, the SMS (Short Messaging Service). In the mobile communication device 102, the message is forwarded to the user identification module 105 that evaluates the message and determines that it includes an instruction to change the value of a parameter. Preferably, the parameter is identified in the instructions and the identification code of the new value of the parameter. This information is passed to the above-describe application, which changes the parameter accordingly, after having successfully authenticated the instructions. For this purpose, known cryptographic methods may be used, which may use digital signatures and/or digital certificates, for example.

However, the change of a value of a parameter may also be initiated in another way. For instance it may be initiated locally by a user operation at the mobile communication device 101. In this case, it may be provided that the user enters a special credential, such as a password or PIN (Personal Identification Number), which is verified in the user identification module 105 before the value of the parameter is changed. Moreover, in one embodiment, the management server 301 already generates commands for modifying the reference included in the standard file 201 of a parameter to address a new value of the parameter. In this case, the user identification module 105 authenticates the commands by cryptographic methods and verifies the validity of the change of the value of the parameter in the way described above before it allows the commands to be executed.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope.

What is claimed is:

1. A user identification module configured for use in a mobile communication device, the user identification module comprising:
   memory, which further comprises:
   a first data item stored in the user identification module, the first data item being accessible for reading a value of a parameter used in the operation of the user identification module;
   wherein the first data item is included in a first elementary file stored in the user identification module;
   at least two second data items stored in the user identification module, the second data items being unmodifiable and each second data item including a value of the parameter;
   wherein the second data items are included in a second elementary file stored in the user identification module, particularly in a table comprised in the second elementary file;
   the first data item including a modifiable reference addressing one of the at least two second data items such that the value of the parameter read from the first data item can be changed by modifying the modifiable reference;
   wherein the modifiable reference is chosen to address the second data item including a desired value of the parameter;
   wherein an identification code is assigned to each second data item and wherein the modifiable reference includes the identification code, allowed values of the modifiable reference being restricted to the identification codes assigned to the second items; and
   wherein the modifiable reference including a part with a name of the second elementary file, and wherein the part of the reference with the name of the second elementary file is configured to be not modifiable.

2. The user identification module recited in claim 1, wherein the first elementary file is a standard file assigned to the parameter.

3. The user identification module recited in claim 1, wherein the parameter comprises a user identification code for identifying a user in a mobile communication network or a cryptographic key used for authenticating a user in a mobile communication network.

4. The user identification module recited in claim 1, wherein the modifiable reference is modifiable in response to a command received in the user identification module from a remote location.

5. The user identification module recited in claim 1, wherein the user identification module is configured as a Subscriber Identity Module or as a Universal Subscriber Identity Module.

6. A mobile communication device, comprising:
   a user identification module, the user identification module comprising memory, which further comprises:
   a first data item being accessible for reading a value of a parameter used in the operation of the user identification module;
   wherein the first data item is included in a first elementary file stored in the user identification module;
   at least two second data items, the second data items being unmodifiable and each second data item including a value of the parameter;
   wherein the second data items are included in a second elementary file stored in the user identification module, particularly in a table comprised in the second elementary file;
   the first data item including a modifiable reference addressing one of the at least two second data items such that the value of the parameter read from the first data item can be changed by modifying the modifiable reference;
   wherein the modifiable reference is chosen to address the second data item including a desired value of the parameter;
   wherein an identification code is assigned to each second data item and wherein the modifiable reference includes the identification code, allowed values of the modifiable reference being restricted to the identification codes assigned to the second items; and
   wherein the modifiable reference including a part with a name of the second elementary file, and wherein the part of the modifiable reference with the name of the second elementary file is configured to be not modifiable.

7. A system for changing a parameter of a user identification module, comprising:
   a user identification module, the user identification module comprising memory, which further comprises:
   a first data item stored in the user identification module, the first data item being accessible for reading a value of a parameter used in the operation of the user identification module;
   wherein the first data item is included in a first elementary file stored in the user identification module;
   at least two second data items stored in the user identification module, the second data items being unmodifiable and each second data item including a value of the parameter;

wherein the second data items are included in a second elementary file stored in the user identification module, particularly in a table comprised in the second elementary file;

the first data item including a modifiable reference addressing one of the at least two second data items such that the value of the parameter read from the first data item can be changed by modifying the modifiable reference, wherein the modifiable reference is chosen to address the second data item including a desired value of the parameter;

wherein an identification code is assigned to each second data item and wherein the modifiable reference includes the identification code, allowed values of the modifiable reference being restricted to the identification code assigned to each second data item; and wherein the modifiable reference includes a part with a name of the second elementary file, and wherein the part is configured to be not modifiable; and a remote server being connectable to the user identification module, the remote server being adapted to transmit an instruction to the user identification module, the instruction specifying one second data item, wherein the user identification module is adapted to modify the modifiable reference to refer to the specified second data item in response to a receipt of the instruction.

8. A method for changing a value of a parameter stored in a user identification module, the parameter being read from a first data item stored in the user identification module, the first data item including a modifiable reference addressing one of a plurality of second data items stored in the user identification module, wherein the first data item is included in a first elementary file stored in the user identification module, the second data items being unmodifiable and each second data item including a value of the parameter, wherein the second data items are included in a second elementary file stored in the user identification module, particularly in a table comprised in the second elementary file, the method comprising:

changing the modifiable reference referring to one second data item to refer to a further second data item to change the value of the parameter by means of an identification code being assigned to each second data item, wherein the reference includes the identification code;

restricting allowed values of the modifiable reference to the identification codes assigned to the second items by means of a part included in the modifiable reference with a name of the second elementary file, and wherein the part of the modifiable reference with the name of the second elementary file is configured to be not modifiable; and wherein the modifiable reference is chosen to address the second data item including a desired value of the parameter.

9. The method recited in claim 8, wherein the modifiable reference is changed in response to a receipt of a command received via a communication network, the user identification module being connected to the communication network via a mobile communication device.

10. The method recited in claim 9, wherein the command is transmitted to the user identification module from a remote server connected to the communication network.

* * * * *